(12) United States Patent
Kon

(10) Patent No.: US 8,195,007 B2
(45) Date of Patent: Jun. 5, 2012

(54) IMAGE SELECTING APPARATUS AND IMAGE SELECTING METHOD

(75) Inventor: Karin Kon, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 694 days.

(21) Appl. No.: 12/411,152

(22) Filed: Mar. 25, 2009

(65) Prior Publication Data

US 2009/0245642 A1  Oct. 1, 2009

(30) Foreign Application Priority Data

Mar. 26, 2008  (JP) ................. 2008-081446

(51) Int. Cl.
*G06K 9/32* (2006.01)
*G06K 9/54* (2006.01)
*G06K 9/03* (2006.01)

(52) U.S. Cl. .......... 382/295; 382/305; 382/311

(58) Field of Classification Search .......... 382/181, 382/291, 295, 305, 306, 309, 311; 358/452; 702/202
See application file for complete search history.

(56) References Cited

U.S. PATENT DOCUMENTS

| | | | |
|---|---|---|---|
| 6,324,545 B1* | 11/2001 | Morag | 707/737 |
| 6,727,909 B1* | 4/2004 | Matsumura et al. | 345/629 |
| 7,668,400 B2* | 2/2010 | Widdowson et al. | 382/276 |
| 7,725,355 B2* | 5/2010 | Mitani et al. | 705/26.1 |
| 8,086,612 B2* | 12/2011 | Matsushita et al. | 707/752 |

FOREIGN PATENT DOCUMENTS

| JP | 10-232946 A | 9/1998 |
|---|---|---|
| JP | 3196897 B1 | 6/2001 |

* cited by examiner

*Primary Examiner* — Kanjibhai Patel
(74) *Attorney, Agent, or Firm* — Sughrue Mion, PLLC

(57) ABSTRACT

The image selecting apparatus includes plural operation indicating units that indicate arrangement places of images on an electronic album, an operator recognizing unit that acquires identification information of the plural operation indicating units, an image selecting unit that automatically selects, based on the identification information, as an image of an available image group, at least one image to be arranged on the electronic album out of an image group, an arrangement determining unit that determines propriety of arrangement of the images in the arrangement places and an arrangement instructing unit that determines images to be arranged in the determined arrangement places out of the available image group, and arranges the images. The image selecting method is performed by the image selecting apparatus.

8 Claims, 4 Drawing Sheets

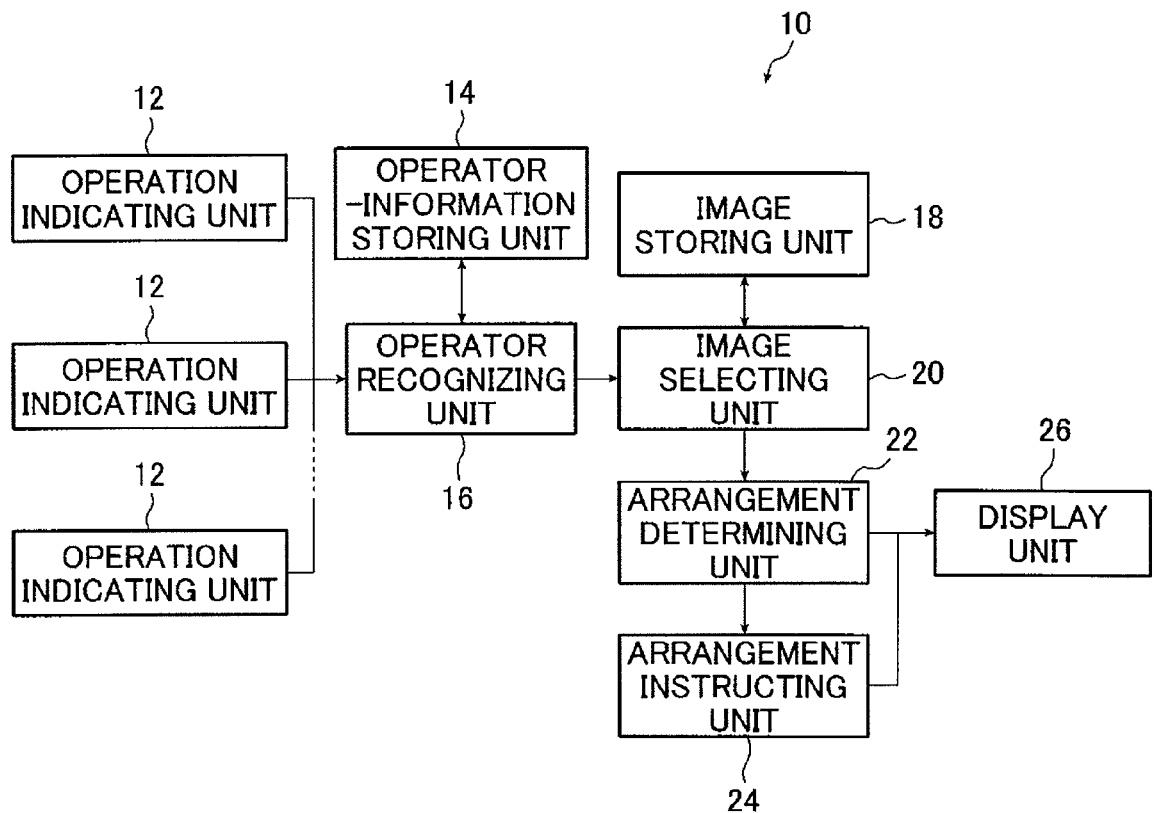

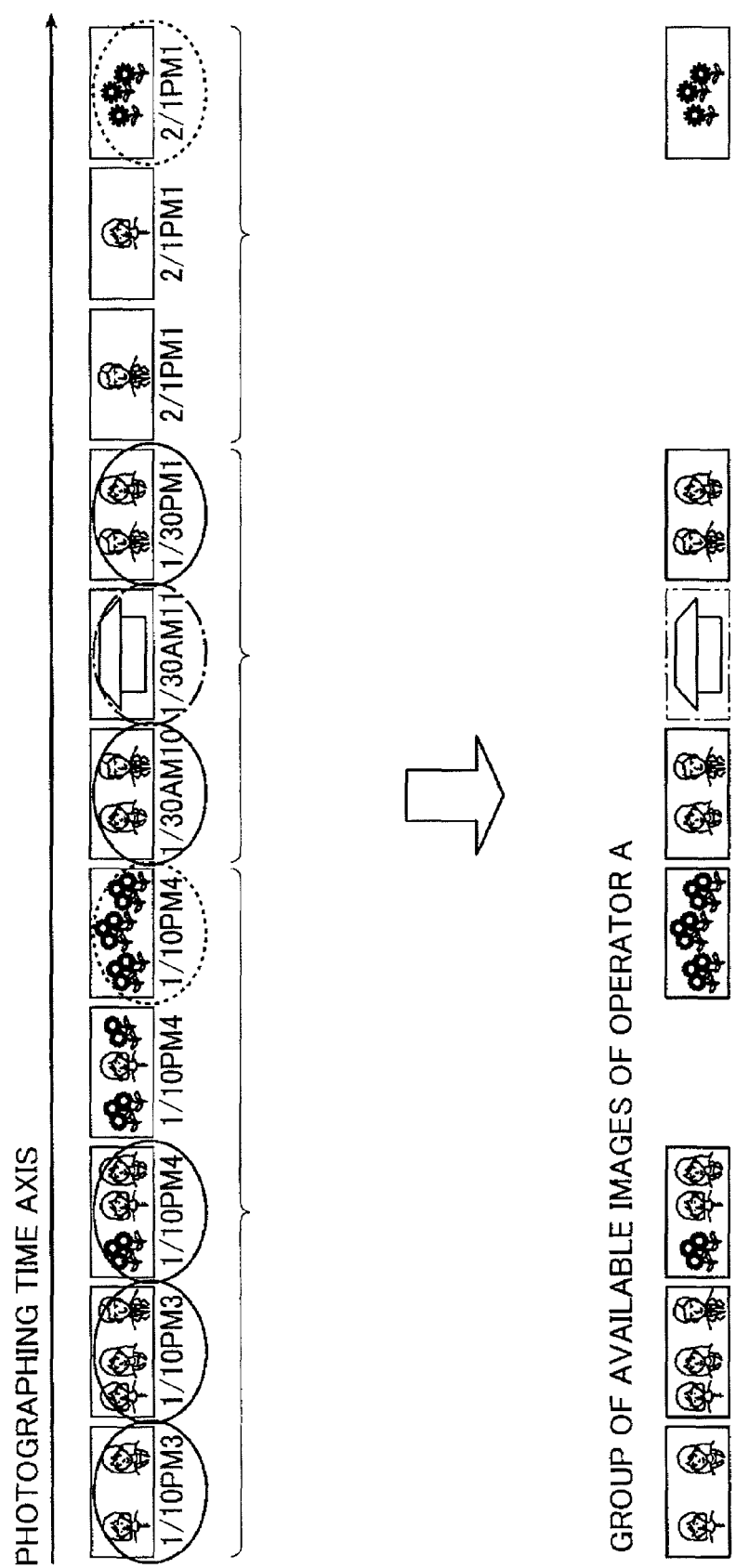

GROUP OF AVAILABLE IMAGES OF A: 30 IMAGES
GROUP OF AVAILABLE IMAGES OF B: 45 IMAGES

FIG.7
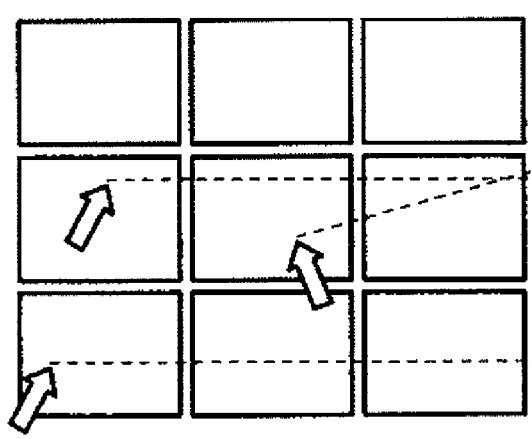
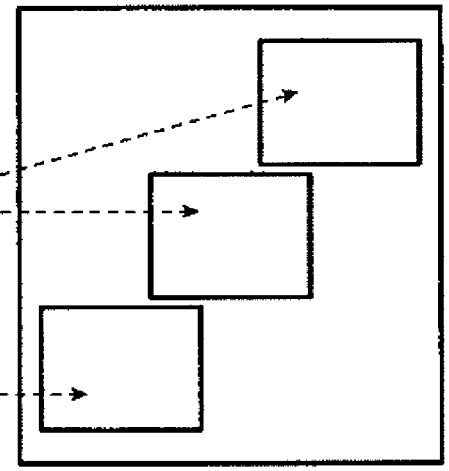
GROUP OF IMAGES
TO BE SELECTED
ARRANGEMENT
TEMPLATE

IMAGE SELECTING APPARATUS AND IMAGE SELECTING METHOD

The entire contents of documents cited in this specification are incorporated herein by reference.

BACKGROUND OF THE INVENTION

The present invention relates to an image selecting apparatus and an image selecting method for allowing a user to edit and view image data as an electronic album, and more particularly, to an image selecting apparatus and an image selecting method for allowing a plurality of users to simultaneously perform editing an electronic album.

In recent years, there have been proposed various image editing systems for allowing a plurality of users to edit and store image data as an electronic album to be shared and viewed among the plurality of users. In such systems as described above, there has been also proposed a method for producing an album in accordance with a user's taste by editing, e.g., selecting and arranging images to be laid out in an electronic album and decorating in album pages as desired.

A method involving editing an album is disclosed in, for example, JP 10-232946 A. In an image processing apparatus and an image processing method disclosed in JP 10-232946 A, editing of an album is performed by displaying, on an image-listing window on a right side of a screen, images to be laid out on a template and letting an operator to select favorite images. According to JP 10-232946 A, the operator can select favorite images from the image-listing window and drag and drop the images to an image selection window displayed on a left side of the screen using a mouse to thereby arrange the selected images on an arbitrary page in an arbitrary order.

JP 3196897 B discloses an image printing apparatus for allowing a plurality of users to edit concerning one image. According to JP 3196897 B, having a plurality of display screens, a plurality of image editing means corresponding to the respective display screens are provided, whereby a plurality of users can simultaneously and quickly edit photographed images using different display screens and editing means, respectively.

SUMMARY OF THE INVENTION

However, with the method disclosed in JP 10-232946 A, the operator selects images out of a group of images (also referred to as "an image group") displayed on one display screen and displaces the selected images to the image selection window. Therefore, when a plurality of operators simultaneously select one image, image selection instructions and instructions for arrangement on the template from the plurality of operators are intricate, with the result that the images selected by the respective operators cannot be arranged in intended positions. Further, movements of images and the mouse on the screen are complicated, and thus the respective operators cannot specify, on the screen, the action performed by the operators. This makes it difficult to perform an operation such as a drag-and-drop of the images and deteriorates operability.

For example, as shown in FIG. 7 when a plurality of operators simultaneously issue instructions, a plurality of mouse pointers are displayed on a screen and a plurality of images are simultaneously dragged and dropped. Therefore, movements on the screen are extremely complicated and the operators cannot smoothly perform operations.

With the image printing apparatus disclosed in JP 3196897 B, the larger a number of users is, the more display screens are necessary. Further, when two users simultaneously perform editing in the same position on an image, a specific figure is automatically displayed. Therefore, both of editions by the users are not performed in that position.

It is an object of the present invention to solve the above-mentioned problems of the related art and to provide an image selecting apparatus and an image selecting method for allowing, in performing editing such as selection and layout of images to be arranged on an electronic album, each user to easily perform album editing as desired with excellent operability even when a plurality of users simultaneously select and arrange images in one album, without a large number of display screens and without complicating movement on a screen and making operation difficult.

In order to solve the above-described problems, the present invention provides an image selecting apparatus, comprising: plural operation indicating units that indicate arrangement places of images on an electronic album; an operator recognizing unit that acquires identification information of the plural operation indicating units; an image selecting unit that automatically selects, based on the identification information, as an image of an available image group, at least one image to be arranged on the electronic album out of an image group; an arrangement determining unit that determines propriety of arrangement of the images in the arrangement places; and an arrangement instructing unit that determines images to be arranged in the determined arrangement places out of the available image group, and arranges the images.

In the present invention, it is preferable that the image selecting apparatus further comprise an operator-information storing unit that stores recognition information of operators, wherein: the operator recognizing unit acquires the recognition information tied to the identification information from the operator-information storing unit, and transmits the recognition information to the image selecting unit; and the image selecting unit selects the available image group based on the recognition information received.

Preferably, the recognition information includes at least one of face images of the operators and image preference information of the operators.

Preferably, the arrangement determining unit makes it possible to execute an instruction of an operator having a smaller number of images already arranged on the electronic album among available image groups of operators when indications of the arrangement places by the plural operation indicating units are conflicting.

Preferably, the arrangement determining unit makes it possible to execute an instruction of an operator having a smaller number of images in available image groups of operators when indications of the arrangement places by the plural operation indicating units are conflicting.

Preferably, the arrangement instructing unit automatically selects images out of the available image group and arranges the images in the arrangement places.

Preferably, the arrangement instructing unit arranges the images selected out of the available image group by each of the plural operation indicating units in the arrangement places.

Preferably, the plural operation indicating units each indicate the arrangement places of the images on the electronic album via a network; and the same electronic album is simultaneously accessed by the plural operation indicating units so that the images to be laid out on the electronic album are selected out of the image group.

In addition, the present invention provides an image selecting method for plural operators to simultaneously access the same electronic album and select images to be laid out on the same electronic album out of an image group, comprising: indicating arrangement places of the images on the same electronic album; acquiring identification information of the plural operators who have indicated the arrangement places; automatically selecting, based on the identification information, as an image of an available image group, at least one image to be arranged on the same electronic album out of the image group; determining propriety of arrangement of the images in the arrangement places; and determining images to be arranged in the determined arrangement places out of the available image group and arranging the images.

With the image selecting apparatus and the image selecting method according to the present invention, even when a plurality of users simultaneously perform editing such as selection and arrangement of images in the same album, it is possible to identify the users who are editing and to automatically select images selectable by the respective users. Therefore, it is possible to simply perform album editing with excellent operability without the necessity of a large number of display screens and without complicating movements on a screen and making operation difficult.

BRIEF DESCRIPTION OF THE DRAWINGS

In the accompanying drawings:

FIG. 1 is a block diagram of an example of an apparatus configuration of an image selecting apparatus according to the present invention;

FIG. 2 is a diagram of an example of recognition information;

FIG. 3 is a conceptual diagram of an example of a method of determining images to be arranged;

FIG. 7 is a conceptual diagram of an example of arrangement instructions issued by a plurality of operators in a conventional apparatus.

DETAILED DESCRIPTION OF THE PREFERRED EMBODIMENT

Figure 4:
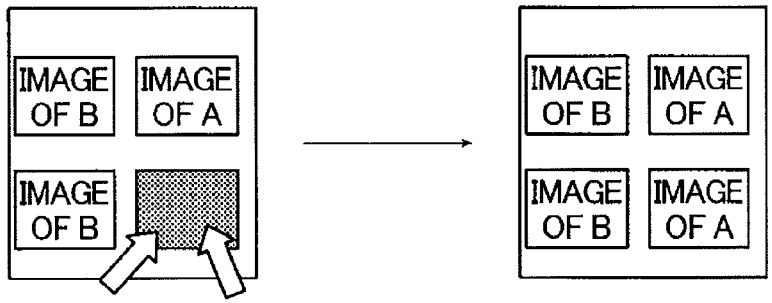
FIG. 4 is a conceptual diagram of an example of a method of determining whether an arrangement instruction can be executed.

With reference to a preferred embodiment illustrated in the accompanying drawings, an image selecting apparatus according to the present invention for realizing an image selecting method according to the present invention is described in detail below.

FIG. 1 is a block diagram of an apparatus configuration of the image selecting apparatus according to the embodiment of the present invention.

An image selecting apparatus 10 illustrated in FIG. 1 includes operation indicating units 12, an operator-information storing unit 14, an operator recognizing unit 16, an image storing unit 18, an image selecting unit 20, an arrangement determining unit 22, an arrangement instructing unit 24, and a display unit 26.

The operation indicating units 12 are units for instructing operations for arrangement of images on an album shared among a plurality of operators. The operators respectively have the operation indicating units 12 on their own. The operators select images to be arranged on the album and lay out the images using the operation indicating units 12.

The operation indicating units 12 are publicly-known means such as a remote controller by infrared-ray communication, a mouse and a keyboard of a PC, and a touch pen.

The operation indicating units 12 respectively have identification information unique thereto. An operator operates his or her own operation indicating units 12 to thereby transmit arrangement indication information of images on the album and identification information of the operator to the operator recognizing unit 16 in association with each other, and requests album editing. Specifically, the operator determines, looking at a layout screen of the album displayed on the display unit 26, places in which the operator desires to arrange the images on the album, transmits his or her own identification information to the operator recognizing unit 16, and indicates arrangement places using the operation indicating unit 12.

Consequently, even when the plurality of operators perform operation indication on the layout screen of the album, it is possible to recognize which operators issue which instructions. Those operations are described in detail later.

The operator-information storing unit 14 is a database that stores information concerning the respective operators who have the operation indicating units 12.

IDs, face images, and the like of the operators are registered in advance in the operator-information storing unit 14 as recognition information for recognizing the operators. Such information can be added and updated when necessary. The recognition information is used for specifying the operators in the operator recognizing unit 16 and is also used in processing in the image selecting unit 20 described later.

An example of the recognition information stored in the operator-information storing unit 14 is illustrated in FIG. 2.

In this embodiment, operator IDs, face images of the operators, and image preference keywords (keywords for an operator's favorite images) are used as the recognition information. Such recognition information is registered in advance for each operator and stored in the operator-information storing unit 14.

An operator ID is an ID unique to his or her operation indicating unit 12. When the recognition information is registered, the operator ID is automatically set in the operator-information storing unit 14 in association with the identification information of the operation indicating unit 12.

A face image is a face image of the operator who has the operation indicating unit 12. The face image is used when the image selecting unit 20 automatically selects a group of available images that can be arranged for each operator. The selection of images is described in detail later.

A plurality of the face images may be registered for one operator. When the plurality of the face images are stored, a priority order is set for the respective face images. The priority order of the face images is determined based on, for example, whether a face is facing the front, the latest photographing date and time, whether a photographing date and time are closer to those of a target image, whether a face image of a face has a size equal to or larger than a predetermined threshold, and whether a face image keeps a quality level equal to or higher than a certain level. The setting of the priority order only has to be made so as to set a higher priority order for an image that can be more accurately compared.

As the image preference keywords, keywords concerning favorite images of the operator are registered. For example, a keyword "flower" is registered for an operator who likes flowers and a keyword "car" is registered for an operator who likes cars. The keywords may be not only names of objects but also colors such as "red" and "blue" or scenes such as a "night view".

The operator recognizing unit 16 recognizes an operator based on the identification information of the operation indicating unit 12 and the recognition information of the operator-information storing unit 14.

When album editing is requested through the operation indicating unit 12, the operator recognizing unit 16 acquires recognition information corresponding to the identification information received from the operation indicating unit 12 out of the recognition information of the respective operators stored in the operator-information storing unit 14.

Further, the operator recognizing unit 16 transmits the acquired recognition information to the image selecting unit 20.

The image storing unit 18 stores a group of images to be arranged on the album. The images stored in the image storing unit 18 respectively include photographing information such as photographing date and time.

The image selecting unit 20 selects, based on the recognition information received from the operator recognizing unit 16 and the photographing information of the images stored in the image storing unit 18, images that can be arranged by each operator out of the image storing unit 18, and sets the images as images of a group of available images.

The selection of images is performed by extracting all images related to an operator out of the group of images stored in the image storing unit 18. Examples of the related images include an image showing the operator, an image related to the image showing the operator, and an image matching the operator's taste.

First, the selection of an image showing the operator is described.

The image selecting unit 20 applies face extraction to the group of images stored in the image storing unit 18 and determines that an image from which a face is extracted be an image showing a person as a subject.

The image selecting unit 20 compares a face area of the image determined as the image showing a person and a face image of the operator included in the recognition information received from the operator recognizing unit 16. The comparison of the face images may be performed according to publicly-known face recognition processing. When both the face images show the same person, the image selecting unit 20 determines that the operator is shown in the image and selects the image as an image of a group of available images that can be arranged on an album by the operator.

Next, the selection of an image related to the image showing the operator and an image matching the operator's taste is described.

The image selecting unit 20 extracts, based on an image preference keyword of the operator included in the recognition information received from the operator recognizing unit 16 and the photographing information of the respective images stored in the image storing unit 18, an image related to the operator and an image matching the operator's taste out of images from which faces are not extracted by the image selecting unit 20. The image selecting unit 20 selects those images as images of a group of available images.

Association of images is described in detail with reference to FIG. 3.

In FIG. 3, images encircled by solid lines are available images determined as showing an operator A by the image selecting unit 20. The operator A is shown in all the images.

First, the image selecting unit 20 extracts an image related to the operator A using photographing information of each image. If a time difference between photographing date and time of an image not showing a person and photographing date and time of any one of the images of a group of selected available images is within a certain range, the image selecting unit 20 determines the image not showing a person as an image related to the operator A and selects the image to be put into a group of available images. For example, in FIG. 3, if the certain range of the time difference is 2 hours, a time difference between photographing date and time of an image encircled by a dashed-dotted line and photographing date and time of an available image on the left of the image is only 1 hour. Therefore, the image selecting unit 20 determines that the two images are related, and selects the image encircled by a dashed dotted line to put into a group of available images of the operator A.

Subsequently, the image selecting unit 20 extracts an image matching the operator A's taste using recognition information of the operator A and the photographing information of the images stored in the image storing unit 18.

Provided that the recognition information of the operator A is the recognition information illustrated in FIG. 2, image preference keywords of the operator A are "plant and flower".

The image selecting unit 20 extracts, based on the keyword, an image showing flowers among images not showing a person and selects the image to put into the group of available images of the operator A. In FIG. 3, two images encircled by dotted lines show flowers, and hence those images are selected to be put into the group of available images of the operator A.

The image preference keyword may be not only a name of a subject but also a color. For example, if "pink" is registered as the keyword, an image including a large pink area may be extracted and selected to be put into the group of available images of the operator A based on tint information obtained as a result of analyzing images.

As the extraction of an image performed by using the image preference keyword, images may be analyzed by a publicly-known method to extract an image according to an image characteristic amount. Alternatively, scene information, keywords, and the like may be added to images as tag information in advance during image photographing, and may be compared with an image preference keyword of recognition information to extract a group of available images.

As described above, the image selecting unit 20 extracts the image showing the operator A, the image related to the operator A, and the image matching the operator's taste to automatically select the images for the group of available images of the operator A.

In some cases, the group of available images includes images shared by other operators' groups of available images. For example, an image showing both operators A and B can be selected as an image to be included in groups of available images of both the operators A and B. Both operators A and B can arrange the image on the album.

The arrangement determining unit 22 determines whether images can be arranged in arrangement places indicated by the operation indicating unit 12.

When a plurality of operators simultaneously arrange images on the album, in some cases, the plurality of operators issue instructions to arrange different images in the same place or arrange the same image in different places. When image arrangement instructions of the plurality of operators conflict with each other or get intricate in this way, the arrangement determining unit 22 determines which operator's arrangement instruction should be preferentially executed.

The determination on which arrangement instruction should be executed is performed according to which operator's available image group images already arranged on the album belong to.

Figure 5:
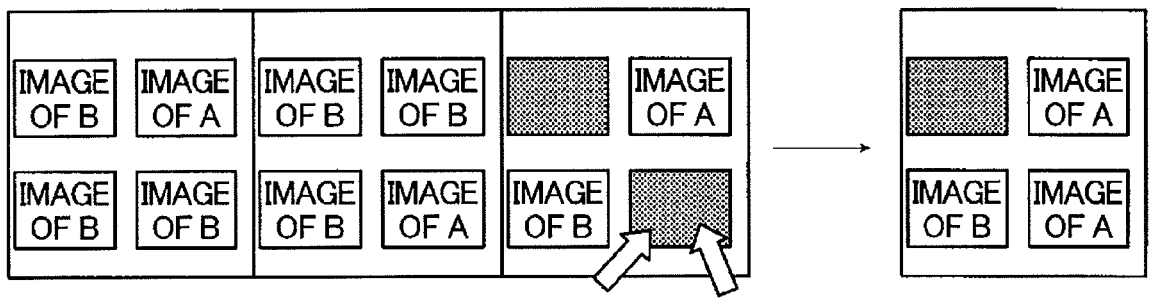
FIG. 5 is a conceptual diagram of another example of the method of determining whether an arrangement instruction can be executed.
Figure 6:
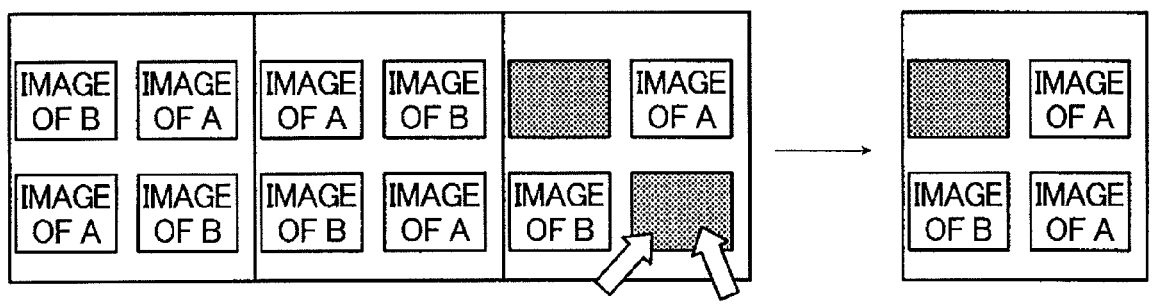
FIG. 6 is a conceptual diagram of still another example of the method of determining whether an arrangement instruction can be executed.

Examples of a method of determining an arrangement instruction are illustrated in FIGS. 4 to 6.

An example of a layout screen of the album is illustrated in FIG. 4. On a page of the album illustrated in FIG. 4, one image out of the group of available images of the operator A and two images out of the group of available images of the operator B are already arranged.

It is assumed that the operators A and B issue instructions to arrange an image in a lower right arrangement place.

First, the arrangement determining unit 22 determines which operator's available images are already arranged on the page, in which conflicting image arrangement instructions are issued. As described above, in the example illustrated in FIG. 4, one image of an available image of the operator A and two images of available images of the operator B are arranged on this page. The number of arranged available images of the operator A is smaller than the number of arranged available images of the operator B.

Therefore, in this case, the operator A has arrangement precedence over the operator B, and the arrangement determining unit 22 preferentially executes an arrangement instruction of the operator A. In other words, the arrangement determining unit 22 executes the arrangement instruction of the operator A and invalidates an arrangement instruction of the operator B.

Another example of the layout screen of the album is illustrated in FIG. 5.

As in the case of FIG. 4, it is assumed that the operators A and B issue instructions for arranging an image in a lower right arrangement place of a page.

In FIG. 5, one image out of the group of available images of the operator A and one image out of the group of available images of the operator B are already arranged on the page, in which conflicting image arrangement instructions are issued. In other words, the number of available images of the operator A arranged on the page and the number of available images of the operator B arranged on the page are the same.

In such a case as described above, the arrangement determining unit 22 determines to which operator's group of available images already arranged on pages other than the page, on which the conflicting image arrangement instructions are issued, belong to.

In the example illustrated in FIG. 5, two images of available images of the operator A and six images of available images of the operator B are arranged on two pages preceding the page. Accordingly, the number of arranged available images of the operator A is smaller than that of the operator B. Therefore, in this case, the operator A has arrangement precedence over the operator B, and the arrangement determining unit 22 preferentially executes the arrangement instruction of the operator A.

Even when no image of the operators who issue conflicting image arrangement instructions is arranged on the page on which the conflicting image arrangement instructions are issued, it is also possible to determine, according to the method illustrated in FIG. 5, which of the instructions should be preferentially executed.

Still another example of the layout screen of the album is illustrated in FIG. 6.

In FIG. 6, as in the case of FIGS. 4 and 5, it is assumed that the operators A and B issue instructions to arrange an image in a lower right arrangement place.

In FIG. 6, as in FIG. 5, the number of available images of the operator A and the number of available images of the operator B arranged on the page on which conflicting image arrangement instructions are issued are the same.

In the example illustrated in FIG. 6, four images of available images of the operator A and four images of available images of the operator B are arranged on two pages preceding this page. It is thus impossible to determine which of the instructions of the operators A and B should be preferentially executed.

In such a case as described above, the arrangement determining unit 22 compares the numbers of available images of the operators and follows the instruction of the operator having a smaller number of available images.

In the example illustrated in FIG. 6, the operator A has thirty images of available images and the operator B has forty-five images of available images. Therefore, in this case, the operator A has arrangement precedence, and the arrangement determining unit 22 preferentially executes the arrangement instruction of the operator A.

When no image of the operators who issue conflicting image arrangement instructions is arranged on the page on which the conflicting image arrangement instructions are issued, and is arranged on other pages either, it is also possible to determine, according to the method illustrated in FIG. 6, which of the instructions should be preferentially executed.

As described above, when the arrangement instructions conflict with each other, the arrangement determining unit 22 preferentially executes the instruction of the operator having a smaller number of images already arranged among the available images of the operators or the instruction of the operator having a smaller number of available images to thereby determine arrangement places of the images of the operators.

When arrangement instructions are not conflicting, the arrangement determining unit 22 determines arrangement places according to the instructions.

When the arrangement places of the images for the operators are determined, the arrangement determining unit 22 transmits the determined arrangement places and recognition information of the operators who instruct the image arrangement to the arrangement instructing unit 24.

The arrangement instructing unit 24 determines an image to be arranged on the album out of the group of available images selected by the image selecting unit 20 and arranges the image on the arrangement place on the layout screen of the album, which is determined by the arrangement determining unit 22.

When the arrangement instructing unit 24 receives information concerning the arrangement places from the arrangement determining unit 22, the arrangement instructing unit 24 recognizes an operator based on recognition information, selects a predetermined image out of the group of available images of the operator who issues an arrangement instruction, and arranges the image in an indicated arrangement place.

In the arrangement instructing unit 24, as a method of selecting images to be arranged, there can be used a method involving manual selection by an operator and a method involving automatic selection by the arrangement instructing unit 24.

When the operator manually determines an image to be arranged, the arrangement instructing unit 24 displays images from the group of available images of the operator one by one in the indicated arrangement place. The order of display is not specifically limited. For example, the images may be displayed in order of photographing date and time, order of image sizes, or order of largeness of the operator shown in the images. A condition of such order of display of the images may be determined by the operator.

When an image that the operator desires to arrange is displayed, the operator selects the image using the operation indicating unit 12. The arrangement instructing unit 24 sets the selected image as an image to be arranged in the arrangement place.

On the other hand, when the arrangement instructing unit 24 automatically determines an image to be arranged, the arrangement instructing unit 24 determines an optimum image out of the group of available images of the operator and arranges the image in a designated arrangement place.

As a method for determining an optimum image, for example, the optimum image only has to be determined according to conditions such as an image showing the operator large, an image showing the operator together with other operators, an image not used in a page of the designated arrangement place or other pages in the album, an image having a quality level equal to or higher than a predetermined value, and an image without a red eye, a blur, and the like.

The arrangement instructing unit 24 sets an image determined as the optimum image according to the above-mentioned conditions as an image to be arranged in the arrangement place.

The display unit 26 displays the layout screen of the album. The display unit 26 may perform various kinds of display according to instructions from the arrangement determining unit 22, the arrangement instructing unit 24, and the other units.

One display unit 26 may be provided to one image selecting apparatus 10 or each of the operators may have one display unit 26. Even when a plurality of the display units 26 are provided, displayed contents are the same in all the display units 26.

Specific actions of the image selecting apparatus according to the present invention for realizing the image selecting method according to the present invention are described below.

First, the layout screen of the album is displayed on the display unit 26. A plurality of operators respectively transmits their own identification information and instructions for arrangement places of images on the album to the operator recognizing unit 16 using their operation indicating units 12 while looking at the display unit 26.

The operator recognizing unit 16 acquires, based on the identification information received from the operation indicating unit 12, recognition information of the operators corresponding to the identification information from the operator-information storing unit 14, and transmits the recognition information to the image selecting unit 20 together with arrangement instructions.

The image selecting unit 20 selects, based on the recognition information, groups of available images of the operators out of those stored in the image storing unit 18. The image selecting unit 20 transmits information concerning the groups of available images to the arrangement determining unit 22 together with the recognition information of the operators and the arrangement instructions.

When arrangement instructions for arrangement in the same place on the album are issued by different operators, the arrangement determining unit 22 determines, based on the received information, instructions to be preferentially executed and determines arrangement places.

When the arrangement places are determined, the arrangement instructing unit 24 selects predetermined images out of the groups of available images of the operators and arranges the images in the determined arrangement places.

In the above-mentioned embodiment of the present invention, the plurality of operators perform layout of images while looking at the screen of one display unit 26 in the same place. However, the present invention is not limited thereto. The operators may respectively have display units. For example, the operators can also perform, from operation terminals such as PCs of the respective operators through a network, layout on an album uploaded to a server on the network. In this case, operation devices such as mouses, keyboards, and touch pens of the operators are the operation indicating units 12, and monitors of the PCs of the operators are the display units 26.

Consequently, the operators can simultaneously perform editing on a real time basis on the network.

As described above, with the image selecting apparatus according to the present invention, the apparatus automatically selects, as groups of available images, images that the operators can arrange. Therefore, the operators can perform layout editing as desired simply by designating arrangement places of images. Consequently, even when a plurality of operators simultaneously perform editing for one album page, movement on the screen is not complicated, whereby operability is not deteriorated.

The image selecting apparatus and the image selecting method according to the present invention have been described in detail. However, it goes without saying that the present invention is not limited to the embodiment described above and various alterations and modifications of the present invention may be made without departing from the spirit of the present invention.

What is claimed is:

1. An image selecting apparatus, comprising:
    plural operation indicating units that indicate arrangement places of images on an electronic album;
        an operator recognizing unit that acquires identification information of said plural operation indicating units;
        an image selecting unit that automatically selects, based on the identification information, as an image of an available image group, at least one image to be arranged on the electronic album out of an image group;
        an operator-information storing unit that stores recognition information of operators, wherein:
        said operator recognizing unit acquires the recognition information tied to the identification information from said operator-information storing unit, and transmits the recognition information to said image selecting unit;
        said image selecting unit selects the available image group based on the recognition information received;
        an arrangement determining unit that determines propriety of arrangement of the images in the arrangement places; and
        an arrangement instructing unit that determines images to be arranged in the determined arrangement places out of the available image group, and arranges the images.

2. The image selecting apparatus according to claim 1, wherein the recognition information includes at least one of face images of the operators and image preference information of the operators.

3. The image selecting apparatus according to claim 1, wherein said arrangement determining unit makes it possible to execute an instruction of an operator having a smaller number of images already arranged on the electronic album among available image groups of operators when indications of the arrangement places by said plural operation indicating units are conflicting.

4. The image selecting apparatus according to claim 1, wherein said arrangement determining unit makes it possible to execute an instruction of an operator having a smaller number of images in available image groups of operators when indications of the arrangement places by said plural operation indicating units are conflicting.

5. The image selecting apparatus according to claim 1, wherein said arrangement instructing unit automatically selects images out of the available image group and arranges the images in the arrangement places.

6. The image selecting apparatus according to claim 1, wherein said arrangement instructing unit arranges the images selected out of the available image group by each of said plural operation indicating units in the arrangement places.

7. The image selecting apparatus according to claim 1, wherein: said plural operation indicating units each indicate the arrangement places of the images on the electronic album via a network; and the same electronic album is simultaneously accessed by said plural operation indicating units so that the images to be laid out on the electronic album are selected out of the image group.

8. An image selecting method for plural operators to simultaneously access the same electronic album and select images to be laid out on the same electronic album out of an image group, comprising:

using an image selecting apparatus to perform the steps of:

indicating arrangement places of the images on the same electronic album; acquiring identification information of the plural operators who have indicated the arrangement places;

automatically selecting, based on the identification information, as an image of an available image group, at least one image to be arranged on the same electronic album out of the image group;

determining propriety of arrangement of the images in the arrangement places; and determining images to be arranged in the determined arrangement places out of the available image group and arranging the images.

* * * * *